United States Patent
Hung

(10) Patent No.: US 7,724,396 B2
(45) Date of Patent: May 25, 2010

(54) METHOD FOR DITHERING IMAGE DATA

(75) Inventor: Chung-Wen Hung, Taichung County (TW)

(73) Assignee: Novatek Microelectronics Corp., Hsinchu (TW)

( * ) Notice: Subject to any disclaimer, the term of this patent is extended or adjusted under 35 U.S.C. 154(b) by 804 days.

(21) Appl. No.: 11/562,990

(22) Filed: Nov. 23, 2006

(65) Prior Publication Data
US 2008/0068661 A1    Mar. 20, 2008

(30) Foreign Application Priority Data
Sep. 20, 2006   (TW) ................ 95134758 A

(51) Int. Cl.
*G06K 15/00*   (2006.01)
(52) U.S. Cl. ............ 358/3.13; 358/3.14; 345/596
(58) Field of Classification Search .......... 358/3.06, 358/3.13, 3.14, 3.16, 534, 535; 345/596, 345/599, 601, 602, 605
See application file for complete search history.

(56) References Cited

U.S. PATENT DOCUMENTS

| | | | | |
|---|---|---|---|---|
| 5,272,471 A * | 12/1993 | Asada et al. | ......... | 345/694 |
| 6,650,337 B2 * | 11/2003 | Stradley et al. | ......... | 345/601 |
| 6,982,722 B1 * | 1/2006 | Alben et al. | ......... | 345/596 |
| 7,233,339 B2 * | 6/2007 | Bae et al. | ......... | 345/596 |
| 7,327,373 B2 * | 2/2008 | Hung | ......... | 345/596 |

* cited by examiner

*Primary Examiner*—Thomas D Lee
(74) *Attorney, Agent, or Firm*—Jianq Chyun IP Office

(57) ABSTRACT

A method for dithering image data is provided. The method is suitable for representing A-bit grayscale values with a B-bit resolution, where A and B are positive integers and A>B. The main steps of the method include calculating $2^A$ target grayscale values with decimals within an interval from 0 to $(2^B-1)*2^{A-B}$, and then representing the target grayscale values with the decimals through 2-dimensional dithering or 3-dimensional dithering.

15 Claims, 1 Drawing Sheet

METHOD FOR DITHERING IMAGE DATA

CROSS-REFERENCE TO RELATED APPLICATION

This application claims the priority benefit of Taiwan application serial no. 95134758, filed Sep. 20, 2006. All disclosure of the Taiwan application is incorporated herein by reference.

BACKGROUND OF THE INVENTION

1. Field of the Invention

The present invention relates to a method for dithering image data. More particularly, the present invention relates to a method for dithering image data capable of completely representing source signal grayscale values.

2. Description of Related Art

It is a common problem in the display of digital images that the grayscale resolution of a display device is less than the grayscale resolution of an output device. For example, the output device is a personal computer with an 8-bit resolution, while the display device is a thin film transistor liquid crystal display panel (TFT LCD panel) with a 6-bit resolution. At this time, the simplest method is to delete two least significant bits (LSB) of the signal grayscale value output from the personal computer, so as to turn the 8-bit grayscale value to a 6-bit grayscale value. However, the color levels of the displayed images are sacrificed if this method is adopted.

Accordingly, a method for increasing the color levels is developed, which performs dithering on the signal grayscale values of the output device. The method utilizes the feature that human eyes automatically average the grayscale values in a small region when viewing from distance to enable the average values to have more color levels. There are two common dithering methods: one of the methods includes the spatial dithering or also referred to as 2-dimensional dithering, and the other method includes the spatial dithering plus temporal dithering or also referred to as 3-dimensional dithering.

The 2-dimensional dithering process is performed in a unit of a pixel block of a fixed size. Table 1 is a table of correspondence between input blocks and output blocks according to the conventional 2-dimensional dithering method, in which the pixel block with a size of 4*2 is used. In the input block section, only two LSBs of the signal grayscale values, i.e., the bits deleted before being transmitted to the display device, are listed. In the output block section, 0 denotes that the signal grayscale value of this pixel needs a non-carry operation, and 1 denotes that the signal grayscale value of this pixel needs a carry operation.

TABLE 1

Table of Correspondence of Conventional 2-Dimensional Dithering

| Input Blocks (Two LSBs) | | | | Output Blocks (Carry) | | | |
|---|---|---|---|---|---|---|---|
| 00 | 00 | 00 | 00 | 0 | 0 | 0 | 0 |
| 00 | 00 | 00 | 00 | 0 | 0 | 0 | 0 |
| 01 | 01 | 01 | 01 | 1 | 0 | 0 | 0 |
| 01 | 01 | 01 | 01 | 0 | 0 | 1 | 0 |
| 10 | 10 | 10 | 10 | 0 | 0 | 0 | 0 |
| 10 | 10 | 10 | 10 | 1 | 1 | 1 | 1 |
| 11 | 11 | 11 | 11 | 0 | 1 | 1 | 1 |
| 11 | 11 | 11 | 11 | 1 | 1 | 0 | 1 |

The non-carry operation is performed to set the two LSBs of the signal grayscale value to 0, and the carry operation is performed to set the two LSBs of the signal grayscale value to 0 and then add 4 to the result. For example, Table 2 shows the output blocks of the signal grayscale values from 8 (1000 in binary) to 11 (1011 in binary) obtained in accordance with the rules of Table 1. As for the values from 8-11, the result of the carry operation is 12, and the result of the non-carry operation is 8.

TABLE 2

Examples of Conventional 2-Dimensional Dithering

| Input Blocks (Decimal) | | | | Output Blocks (Decimal) | | | |
|---|---|---|---|---|---|---|---|
| 8 | 8 | 8 | 8 | 8 | 8 | 8 | 8 |
| 8 | 8 | 8 | 8 | 8 | 8 | 8 | 8 |
| 9 | 9 | 9 | 9 | 12 | 8 | 8 | 8 |
| 9 | 9 | 9 | 9 | 8 | 8 | 12 | 8 |
| 10 | 10 | 10 | 10 | 8 | 8 | 8 | 8 |
| 10 | 10 | 10 | 10 | 12 | 12 | 12 | 12 |
| 11 | 11 | 11 | 11 | 8 | 12 | 12 | 12 |
| 11 | 11 | 11 | 11 | 12 | 12 | 8 | 12 |

It is known from Table 2 that the average values of four output blocks equal to the signal grayscale values of the respective corresponding input blocks, while Table 2 only uses two numerals 8 and 12 to represent 4 different color levels. The two LSBs of 8 and 12 are both 0, which is applicable to the 6-bit resolution.

In another aspect, the 3-dimensional dithering process is performed in a unit of the pixel block of a fixed size in several continuous frames. Table 3 is a table of correspondence between input blocks and output blocks according to the conventional 3-dimensional dithering method, in which the pixel block with the size of 4*2 in four continuous frames is used. Similarly, only two LSBs of the signal grayscale values are listed in the input block section in Table 3. After an input block is found, the fields under the input block are the corresponding output blocks in four continuous frames, wherein 0 denotes that the signal grayscale value of this pixel needs the non-carry operation, and 1 denotes that the signal grayscale value of this pixel needs the carry operation. According to the rules of Table 3, the overall average value of all pixels in the four continuous frames equals to the input signal grayscale value.

TABLE 3

Table of Correspondence of Conventional 3-Dimensional Dithering

| | Input Blocks (LSB) | | | | | | | | | | | | | | | |
|---|---|---|---|---|---|---|---|---|---|---|---|---|---|---|---|---|
| | 00 00 | 00 00 | 00 00 | 00 00 | 01 01 | 01 01 | 01 01 | 01 01 | 10 10 | 10 10 | 10 10 | 10 10 | 11 11 | 11 11 | 11 11 | 11 11 |
| 1st Frame | 0 | 0 | 0 | 0 | 1 | 0 | 0 | 0 | 0 | 0 | 0 | 0 | 0 | 1 | 1 | 1 |
| (Carry) | 0 | 0 | 0 | 0 | 0 | 0 | 1 | 0 | 1 | 1 | 1 | 1 | 1 | 1 | 0 | 1 |
| 2nd Frame | 0 | 0 | 0 | 0 | 0 | 0 | 0 | 1 | 1 | 1 | 1 | 1 | 1 | 1 | 1 | 0 |
| (Carry) | 0 | 0 | 0 | 0 | 0 | 1 | 0 | 0 | 0 | 0 | 0 | 0 | 1 | 0 | 1 | 1 |
| 3rd Frame | 0 | 0 | 0 | 0 | 0 | 0 | 1 | 0 | 0 | 0 | 0 | 0 | 1 | 1 | 0 | 1 |
| (Carry) | 0 | 0 | 0 | 1 | 0 | 0 | 0 | 1 | 1 | 1 | 1 | 0 | 1 | 1 | 1 | 1 |
| 4th Frame | 0 | 0 | 0 | 0 | 0 | 1 | 0 | 0 | 1 | 1 | 1 | 1 | 1 | 0 | 1 | 1 |
| (Carry) | 0 | 0 | 0 | 0 | 0 | 0 | 0 | 1 | 0 | 0 | 0 | 0 | 1 | 1 | 1 | 0 |

However, the conventional dithering methods are disadvantageous in that not all signal grayscale values are represented. For example, in the above examples, the display device has a 6-bit resolution only, so the maximum value is 63, and after being multiplied by 4, only 252 signal grayscale values can be represented in maximum. However, the three primary colors red, green, and blue can be combined to represent $256^3 = 16,777,216$ color originally, while only $253^3 = 16,194,277$ is represented after the dithering, thus losing about 3.5% of the color levels.

SUMMARY OF THE INVENTION

The present invention is directed to a method for dithering image data, so as to represent all color levels of an output device with 2-dimensional dithering.

The present invention is also directed to a method for dithering image data, so as to represent all color levels of an output device with 3-dimensional dithering.

In order to achieve the aforementioned and other objectives, the present invention provides a method for dithering image data, which is suitable for representing A-bit grayscale levels with a B-bit resolution, where A and B are both positive integers and A>B. The method includes the following steps. First, a signal grayscale value 0 is corresponded to a target grayscale value 0, and a grayscale value $2^A-1$ is corresponded to a target grayscale value $(2^B-1)*2^{A-B}$. A target grayscale value corresponding to the signal grayscale value among the signal grayscale values from 1 to $2^A-2$ is calculated through interpolation and rounding off. The $2^A$ target grayscale values form a strictly increasing sequence. When represented in binary, each of the target grayscale values includes A integer digits and C decimal digits, where C is a positive integer.

Then, if the signal grayscale value to be represented is X, according to the correspondence between the $2^A$ signal grayscales and the $2^A$ target grayscale values, the target grayscale value Y corresponding to the signal grayscale value X is obtained. Then, $D=A-B+C$ is calculated, and a value K of the D LSBs of Y is calculated. Finally, in one E*F pixel block, the grayscale values of N pixels are set to $Y-K+2^{A-B}$, and the other grayscale values of the rest E*F–N pixels are set to Y−K, wherein E*F is a multiple of $2^D$, and $N/(E*F)=K/2^{A-B}$.

In order to achieve the aforementioned and other objectives, the present invention provides another method for dithering image data. The first few steps of this method are the same as the previous method, and the last step is changed as follows. Among altogether E*F*P pixels included an E*F pixel block in P continuous frames, the grayscale value of N pixels is set to $Y-K+2^{A-B}$, and the grayscale value of the rest E*F*P−N pixels is set to Y−K, wherein E*F*P is a multiple of $2^D$, and $N/(E*F*P)=K/2^{A-B}$.

As described above, the present invention uses decimals. $2^A$ target grayscale values within the interval from 0 to $(2^B-1)*2^{A-B}$ are calculated, and then the target grayscale values with decimals are represented by using finer 2-dimensional dithering or 3-dimensional dithering. Therefore, the present invention is superior compared to the prior art, and can represent all color levels of the output device.

In order to make the aforementioned and other objects, features and advantages of the present invention comprehensible, preferred embodiments accompanied with figures are described in detail below.

DESCRIPTION OF EMBODIMENTS

Figure 1:
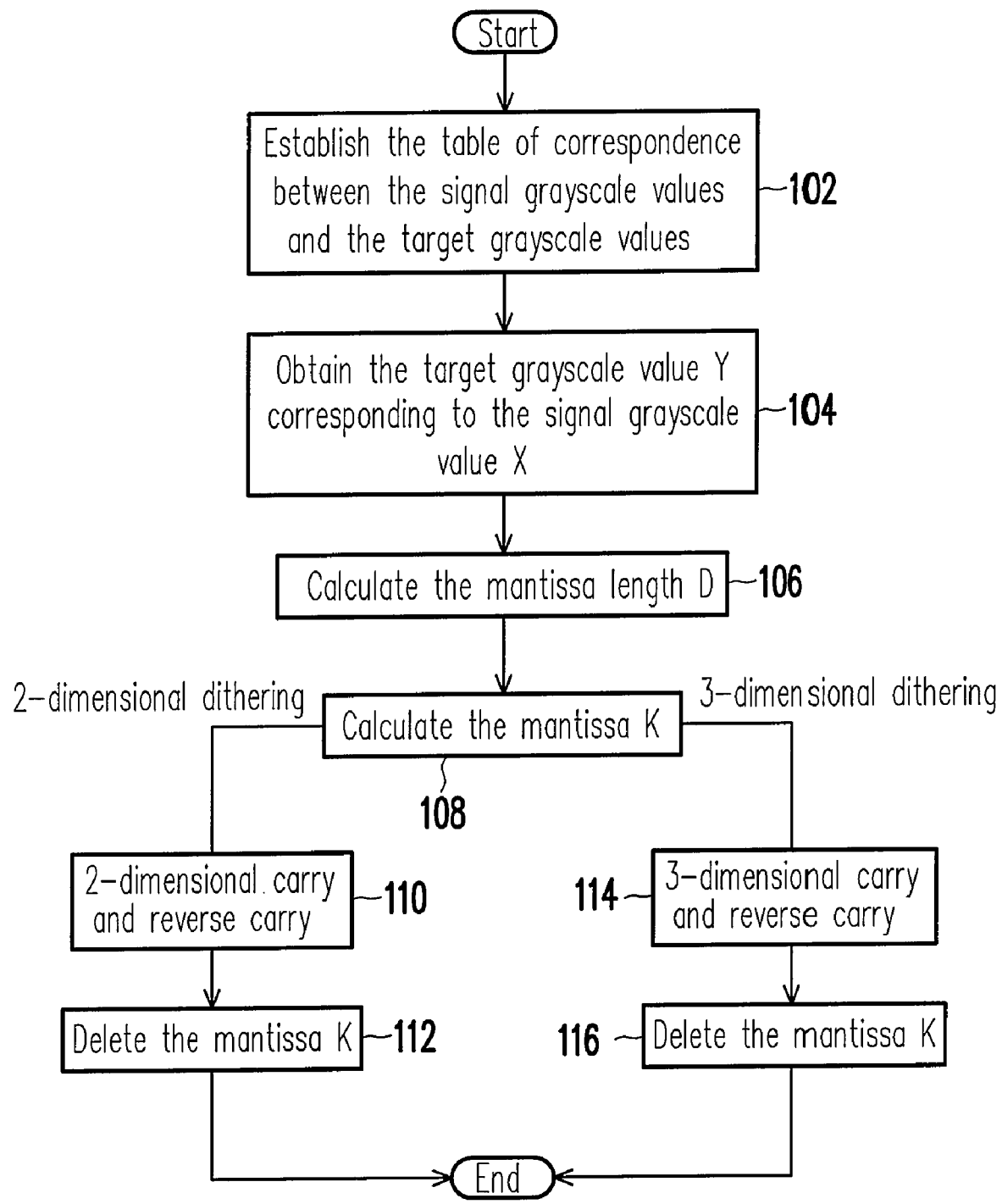
FIG. 1 is a flow chart of a method for dithering image data according to an embodiment of the present invention.

The present invention provides a 2-dimensional dithering method and a 3-dimensional dithering method. The present invention will be illustrated with a simple embodiment first, and then will be illustrated with more complicated general rules.

This embodiment uses a 6-bit resolution to represent 8-bit color levels. In consideration of the conventional dithering method dividing 252 signal grayscale values in maximum, the solution in this embodiment includes calculating 256 different target grayscale values within the interval from 0 to 252 to correspond to the original 256 signal grayscale values. Then, the target grayscale values are represented through 2-dimensional dithering or 3-dimensional dithering. Thus, the overall 256 grayscales are represented.

Table 4 is a table of correspondence of the signal grayscale values and the target grayscale values of this embodiment, in which the target grayscale values are obtained with interpolation first, and then are rounded off to multiples of 0.25. For example, if the signal grayscale value X=9, the target grayscale value Y=9. If X=60, then Y=59.25. If X=192, then Y=189.75. If X=255, then Y=252.

TABLE 4

Table of Correspondence between Signal Grayscale Values and Target Grayscale Values of an Embodiment of the Present Invention

| Signal Grayscale Value X | Target Grayscale Value Y |
|---|---|
| $0 \leq X \leq 10$ | $Y = X$ |
| $11 \leq X \leq 31$ | $Y = X - 0.25$ |
| $32 \leq X \leq 53$ | $Y = X - 0.5$ |

TABLE 4-continued

Table of Correspondence between Signal Grayscale Values and Target Grayscale Values of an Embodiment of the Present Invention

| Signal Grayscale Value X | Target Grayscale Value Y |
|---|---|
| 54 ≦ X ≦ 74 | Y = X − 0.75 |
| 75 ≦ X ≦ 95 | Y = X − 1 |
| 96 ≦ X ≦ 116 | Y = X − 1.25 |
| 117 ≦ X ≦ 138 | Y = X − 1.5 |
| 139 ≦ X ≦ 159 | Y = X − 1.75 |
| 160 ≦ X ≦ 180 | Y = X − 2 |
| 181 ≦ X ≦ 201 | Y = X − 2.25 |
| 202 ≦ X ≦ 223 | Y = X − 2.5 |
| 224 ≦ X ≦ 244 | Y = X − 2.75 |
| 245 ≦ X ≦ 255 | Y = X − 3 |

By looking up Table 4, any signal grayscale value from 0 to 255 can be converted to the corresponding target grayscale value. The next step involves representing the target grayscale values with decimals by using 2-dimensional dithering or 3-dimensional dithering. If the 2-dimensional dithering is used, the average grayscale value in a pixel block must be made equal to the target grayscale value. If the 3-dimensional dithering is used, the average grayscale value in one pixel block in several continuous frames must be made to equal to the target grayscale value.

Table 5 is a table of correspondence between the input blocks and the output blocks of the 2-dimensional dithering method in this embodiment. The 2-dimensional dithering in this embodiment uses 4*8 pixel blocks. Only four LSBs of the target grayscale values are listed in the input block sections in Table 5. It should be noted that all the target grayscale values of this embodiment include two decimal digits if expressed in binary, and the aforementioned four LSBs include the decimals. For example, the target grayscale value 106.75 is 01101010.11 in binary, and the four LSBs are 1011. That is, the 8-bit signal grayscale value is converted to a 10-bit target grayscale value, and four LSBs of the target grayscale value are taken to find out the corresponding output block by looking up Table 5.

TABLE 5

Table of Correspondence of 2-Dimensional Dithering according to an Embodiment of the Present Invention

| Input Blocks (4 LSBs) | | | | Output Blocks (Carry) | | | | Input Blocks (4 LSBs) | | | | Output Blocks (Carry) | | | |
|---|---|---|---|---|---|---|---|---|---|---|---|---|---|---|---|
| 0000 | 0000 | 0000 | 0000 | 0 | 0 | 0 | 0 | 1000 | 1000 | 1000 | 1000 | 0 | 0 | 0 | 0 |
| 0000 | 0000 | 0000 | 0000 | 0 | 0 | 0 | 0 | 1000 | 1000 | 1000 | 1000 | 1 | 1 | 1 | 1 |
| 0000 | 0000 | 0000 | 0000 | 0 | 0 | 0 | 0 | 1000 | 1000 | 1000 | 1000 | 0 | 0 | 0 | 0 |
| 0000 | 0000 | 0000 | 0000 | 0 | 0 | 0 | 0 | 1000 | 1000 | 1000 | 1000 | 1 | 1 | 1 | 1 |
| 0000 | 0000 | 0000 | 0000 | 0 | 0 | 0 | 0 | 1000 | 1000 | 1000 | 1000 | 0 | 0 | 0 | 0 |
| 0000 | 0000 | 0000 | 0000 | 0 | 0 | 0 | 0 | 1000 | 1000 | 1000 | 1000 | 1 | 1 | 1 | 1 |
| 0000 | 0000 | 0000 | 0000 | 0 | 0 | 0 | 0 | 1000 | 1000 | 1000 | 1000 | 0 | 0 | 0 | 0 |
| 0000 | 0000 | 0000 | 0000 | 0 | 0 | 0 | 0 | 1000 | 1000 | 1000 | 1000 | 1 | 1 | 1 | 1 |
| 0001 | 0001 | 0001 | 0001 | 0 | 0 | 0 | 0 | 1001 | 1001 | 1001 | 1001 | 0 | 0 | 0 | 0 |
| 0001 | 0001 | 0001 | 0001 | 0 | 0 | 0 | 0 | 1001 | 1001 | 1001 | 1001 | 1 | 1 | 1 | 1 |
| 0001 | 0001 | 0001 | 0001 | 0 | 0 | 0 | 0 | 1001 | 1001 | 1001 | 1001 | 0 | 0 | 0 | 0 |
| 0001 | 0001 | 0001 | 0001 | 0 | 0 | 0 | 0 | 1001 | 1001 | 1001 | 1001 | 1 | 1 | 1 | 1 |
| 0001 | 0001 | 0001 | 0001 | 0 | 0 | 0 | 0 | 1001 | 1001 | 1001 | 1001 | 0 | 0 | 0 | 0 |
| 0001 | 0001 | 0001 | 0001 | 0 | 0 | 0 | 0 | 1001 | 1001 | 1001 | 1001 | 1 | 1 | 1 | 1 |
| 0001 | 0001 | 0001 | 0001 | 1 | 0 | 0 | 0 | 1001 | 1001 | 1001 | 1001 | 0 | 1 | 1 | 1 |
| 0001 | 0001 | 0001 | 0001 | 0 | 0 | 1 | 0 | 1001 | 1001 | 1001 | 1001 | 1 | 1 | 0 | 1 |
| 0010 | 0010 | 0010 | 0010 | 0 | 0 | 0 | 0 | 1010 | 1010 | 1010 | 1010 | 0 | 0 | 0 | 0 |
| 0010 | 0010 | 0010 | 0010 | 0 | 0 | 0 | 0 | 1010 | 1010 | 1010 | 1010 | 1 | 1 | 1 | 1 |
| 0010 | 0010 | 0010 | 0010 | 1 | 0 | 0 | 0 | 1010 | 1010 | 1010 | 1010 | 0 | 1 | 1 | 1 |
| 0010 | 0010 | 0010 | 0010 | 0 | 0 | 1 | 0 | 1010 | 1010 | 1010 | 1010 | 1 | 1 | 0 | 1 |
| 0010 | 0010 | 0010 | 0010 | 0 | 0 | 0 | 0 | 1010 | 1010 | 1010 | 1010 | 0 | 0 | 0 | 0 |
| 0010 | 0010 | 0010 | 0010 | 0 | 0 | 0 | 0 | 1010 | 1010 | 1010 | 1010 | 1 | 1 | 1 | 1 |
| 0010 | 0010 | 0010 | 0010 | 1 | 0 | 0 | 0 | 1010 | 1010 | 1010 | 1010 | 0 | 1 | 1 | 1 |
| 0010 | 0010 | 0010 | 0010 | 0 | 0 | 1 | 0 | 1010 | 1010 | 1010 | 1010 | 1 | 1 | 0 | 1 |
| 0011 | 0011 | 0011 | 0011 | 1 | 0 | 0 | 0 | 1011 | 1011 | 1011 | 1011 | 0 | 1 | 1 | 1 |
| 0011 | 0011 | 0011 | 0011 | 0 | 0 | 1 | 0 | 1011 | 1011 | 1011 | 1011 | 1 | 1 | 0 | 1 |
| 0011 | 0011 | 0011 | 0011 | 1 | 0 | 0 | 0 | 1011 | 1011 | 1011 | 1011 | 0 | 1 | 1 | 1 |
| 0011 | 0011 | 0011 | 0011 | 0 | 0 | 1 | 0 | 1011 | 1011 | 1011 | 1011 | 1 | 1 | 0 | 1 |
| 0011 | 0011 | 0011 | 0011 | 1 | 0 | 0 | 0 | 1011 | 1011 | 1011 | 1011 | 0 | 1 | 1 | 1 |
| 0011 | 0011 | 0011 | 0011 | 0 | 0 | 1 | 0 | 1011 | 1011 | 1011 | 1011 | 1 | 1 | 0 | 1 |
| 0011 | 0011 | 0011 | 0011 | 0 | 0 | 0 | 0 | 1011 | 1011 | 1011 | 1011 | 0 | 0 | 0 | 0 |
| 0011 | 0011 | 0011 | 0011 | 1 | 0 | 0 | 0 | 1011 | 1011 | 1011 | 1011 | 1 | 1 | 1 | 1 |
| 0100 | 0100 | 0100 | 0100 | 1 | 0 | 0 | 0 | 1100 | 1100 | 1100 | 1100 | 0 | 1 | 1 | 1 |
| 0100 | 0100 | 0100 | 0100 | 0 | 0 | 1 | 0 | 1100 | 1100 | 1100 | 1100 | 1 | 1 | 0 | 1 |
| 0100 | 0100 | 0100 | 0100 | 1 | 0 | 0 | 0 | 1100 | 1100 | 1100 | 1100 | 0 | 1 | 1 | 1 |
| 0100 | 0100 | 0100 | 0100 | 0 | 0 | 1 | 0 | 1100 | 1100 | 1100 | 1100 | 1 | 1 | 0 | 1 |
| 0100 | 0100 | 0100 | 0100 | 1 | 0 | 0 | 0 | 1100 | 1100 | 1100 | 1100 | 0 | 1 | 1 | 1 |
| 0100 | 0100 | 0100 | 0100 | 0 | 0 | 1 | 0 | 1100 | 1100 | 1100 | 1100 | 1 | 1 | 0 | 1 |
| 0100 | 0100 | 0100 | 0100 | 1 | 0 | 0 | 0 | 1100 | 1100 | 1100 | 1100 | 0 | 1 | 1 | 1 |
| 0100 | 0100 | 0100 | 0100 | 0 | 0 | 1 | 0 | 1100 | 1100 | 1100 | 1100 | 1 | 1 | 0 | 1 |
| 0101 | 0101 | 0101 | 0101 | 1 | 0 | 0 | 0 | 1101 | 1101 | 1101 | 1101 | 0 | 1 | 1 | 1 |
| 0101 | 0101 | 0101 | 0101 | 0 | 0 | 1 | 0 | 1101 | 1101 | 1101 | 1101 | 1 | 1 | 0 | 1 |
| 0101 | 0101 | 0101 | 0101 | 1 | 0 | 0 | 0 | 1101 | 1101 | 1101 | 1101 | 0 | 1 | 1 | 1 |
| 0101 | 0101 | 0101 | 0101 | 0 | 0 | 1 | 0 | 1101 | 1101 | 1101 | 1101 | 1 | 1 | 0 | 1 |
| 0101 | 0101 | 0101 | 0101 | 1 | 0 | 0 | 0 | 1101 | 1101 | 1101 | 1101 | 0 | 1 | 1 | 1 |

TABLE 5-continued

Table of Correspondence of 2-Dimensional Dithering according to an Embodiment of the Present Invention

| Input Blocks (4 LSBs) | | | | Output Blocks (Carry) | | | | Input Blocks (4 LSBs) | | | | Output Blocks (Carry) | | | |
|---|---|---|---|---|---|---|---|---|---|---|---|---|---|---|---|
| 0101 | 0101 | 0101 | 0101 | 0 | 0 | 1 | 0 | 1101 | 1101 | 1101 | 1101 | 1 | 1 | 0 | 1 |
| 0101 | 0101 | 0101 | 0101 | 0 | 0 | 0 | 0 | 1101 | 1101 | 1101 | 1101 | 1 | 1 | 1 | 1 |
| 0101 | 0101 | 0101 | 0101 | 1 | 1 | 1 | 1 | 1101 | 1101 | 1101 | 1101 | 1 | 1 | 1 | 1 |
| 0110 | 0110 | 0110 | 0110 | 1 | 0 | 0 | 0 | 1110 | 1110 | 1110 | 1110 | 0 | 1 | 1 | 1 |
| 0110 | 0110 | 0110 | 0110 | 0 | 0 | 1 | 0 | 1110 | 1110 | 1110 | 1110 | 1 | 1 | 0 | 1 |
| 0110 | 0110 | 0110 | 0110 | 0 | 0 | 0 | 0 | 1110 | 1110 | 1110 | 1110 | 1 | 1 | 1 | 1 |
| 0110 | 0110 | 0110 | 0110 | 1 | 1 | 1 | 1 | 1110 | 1110 | 1110 | 1110 | 1 | 1 | 1 | 1 |
| 0110 | 0110 | 0110 | 0110 | 1 | 0 | 0 | 0 | 1110 | 1110 | 1110 | 1110 | 0 | 1 | 1 | 1 |
| 0110 | 0110 | 0110 | 0110 | 0 | 0 | 1 | 0 | 1110 | 1110 | 1110 | 1110 | 1 | 1 | 0 | 1 |
| 0110 | 0110 | 0110 | 0110 | 0 | 0 | 0 | 0 | 1110 | 1110 | 1110 | 1110 | 1 | 1 | 1 | 1 |
| 0110 | 0110 | 0110 | 0110 | 1 | 1 | 1 | 1 | 1110 | 1110 | 1110 | 1110 | 1 | 1 | 1 | 1 |
| 0111 | 0111 | 0111 | 0111 | 0 | 0 | 0 | 0 | 1111 | 1111 | 1111 | 1111 | 1 | 1 | 1 | 1 |
| 0111 | 0111 | 0111 | 0111 | 1 | 1 | 1 | 1 | 1111 | 1111 | 1111 | 1111 | 1 | 1 | 1 | 1 |
| 0111 | 0111 | 0111 | 0111 | 0 | 0 | 0 | 0 | 1111 | 1111 | 1111 | 1111 | 1 | 1 | 1 | 1 |
| 0111 | 0111 | 0111 | 0111 | 1 | 1 | 1 | 1 | 1111 | 1111 | 1111 | 1111 | 1 | 1 | 1 | 1 |
| 0111 | 0111 | 0111 | 0111 | 0 | 0 | 0 | 0 | 1111 | 1111 | 1111 | 1111 | 1 | 1 | 1 | 1 |
| 0111 | 0111 | 0111 | 0111 | 1 | 1 | 1 | 1 | 1111 | 1111 | 1111 | 1111 | 1 | 1 | 1 | 1 |
| 0111 | 0111 | 0111 | 0111 | 1 | 0 | 0 | 0 | 1111 | 1111 | 1111 | 1111 | 0 | 1 | 1 | 1 |
| 0111 | 0111 | 0111 | 0111 | 0 | 0 | 1 | 0 | 1111 | 1111 | 1111 | 1111 | 1 | 1 | 0 | 1 |

In the output block sections of Table 5, 0 denotes that the corresponding pixel needs the non-carry operation, and 1 denotes that the corresponding pixel needs the carry operation. In this embodiment, the non-carry operation is performed to set four LSBs of the target grayscale value to 0, and the carry operation is performed to set the four LSBs of the target grayscale value to 0 and then add 4 to the result. After setting, the average grayscale values of the output blocks are made equal to the target grayscale values, and the four LSBs of the grayscale values in the output blocks equal to 0. After the four LSBs are deleted, 6-bit integers are obtained, which are applicable to the display device.

Tables 6-1 to 6-8 are tables of correspondence between the input blocks and the output blocks of the 3-dimensional dithering method in this embodiment. The 3-dimensional dithering method of this embodiment uses a 4*2 pixel block in 16 continuous frames as the unit for processing. Similar to the 2-dimensional dithering method, only four LSBs of the target grayscale values are listed in the input block sections in Tables 6-1 to 6-8. After an input block is found with the four LSBs, the fields under the input block are the output blocks in 16 continuous frames. Also, in the output block sections of Tables 6-1 to 6-8, 0 denotes the non-carry operation, and 1 denotes the carry operation. By setting the grayscales in accordance with the rules of Tables 6-1 to 6-8, the average grayscale values of the pixel blocks in 16 continuous frames are made equal to the target grayscale values.

TABLE 6-1

Table of Correspondence of 3-Dimensional Dithering according to an Embodiment of the Present Invention

| | Input Blocks (4 LSBs) | | | | | | | |
|---|---|---|---|---|---|---|---|---|
| | 0000 0000 | 0000 0000 | 0000 0000 | 0000 0000 | 0001 0001 | 0001 0001 | 0001 0001 | 0001 0001 |
| 1st Frame (Carry) | 0 | 0 | 0 | 0 | 0 | 0 | 0 | 0 |
| 2nd Frame | 0 | 0 | 0 | 0 | 0 | 0 | 0 | 0 |

TABLE 6-1-continued

Table of Correspondence of 3-Dimensional Dithering according to an Embodiment of the Present Invention

| | Input Blocks (4 LSBs) | | | | | | | |
|---|---|---|---|---|---|---|---|---|
| | 0000 0000 | 0000 0000 | 0000 0000 | 0000 0000 | 0001 0001 | 0001 0001 | 0001 0001 | 0001 0001 |
| (Carry) | 0 | 0 | 0 | 0 | 0 | 0 | 0 | 0 |
| 3rd Frame (Carry) | 0 | 0 | 0 | 0 | 0 | 0 | 0 | 0 |
| 4th Frame (Carry) | 0 | 0 | 0 | 0 | 0 | 0 | 0 | 0 |
| 5th Frame (Carry) | 0 | 0 | 0 | 0 | 0 | 0 | 0 | 0 |
| 6th Frame (Carry) | 0 | 0 | 0 | 0 | 0 | 0 | 0 | 0 |
| 7th Frame (Carry) | 0 | 0 | 0 | 0 | 0 | 0 | 0 | 0 |
| 8th Frame (Carry) | 0 | 0 | 0 | 0 | 0 | 0 | 0 | 0 |
| 9th Frame (Carry) | 0 | 0 | 0 | 0 | 0 | 0 | 0 | 0 |
| 10th Frame (Carry) | 0 | 0 | 0 | 0 | 0 | 0 | 0 | 0 |
| 11th Frame (Carry) | 0 | 0 | 0 | 0 | 0 | 0 | 0 | 0 |
| 12th Frame (Carry) | 0 | 0 | 0 | 0 | 0 | 0 | 0 | 0 |
| 13th Frame (Carry) | 0 | 0 | 0 | 0 | 1 | 0 | 0 | 0 |
| 14th Frame (Carry) | 0 | 0 | 0 | 0 | 0 | 1 | 0 | 0 |
| 15th Frame (Carry) | 0 | 0 | 0 | 0 | 0 | 0 | 1 | 0 |
| 16th Frame (Carry) | 0 | 0 | 0 | 0 | 0 | 0 | 0 | 1 |

TABLE 6-2

Table of Correspondence of 3-Dimensional Dithering according to an Embodiment of the Present Invention

| | Input Blocks (4 LSBs) | | | | | | | |
|---|---|---|---|---|---|---|---|---|
| | 0010 0010 | 0010 0010 | 0010 0010 | 0010 0010 | 0011 0011 | 0011 0011 | 0011 0011 | 0011 0011 |
| 1st Frame | 0 | 0 | 0 | 0 | 1 | 0 | 0 | 0 |
| (Carry) | 0 | 0 | 0 | 0 | 0 | 0 | 1 | 0 |
| 2nd Frame | 0 | 0 | 0 | 0 | 0 | 0 | 0 | 1 |
| (Carry) | 0 | 0 | 0 | 0 | 0 | 1 | 0 | 0 |
| 3rd Frame | 0 | 0 | 0 | 0 | 0 | 0 | 1 | 0 |
| (Carry) | 0 | 0 | 0 | 0 | 1 | 0 | 0 | 0 |
| 4th Frame | 0 | 0 | 0 | 0 | 0 | 1 | 0 | 0 |
| (Carry) | 0 | 0 | 0 | 0 | 0 | 0 | 0 | 1 |
| 5th Frame | 1 | 0 | 0 | 0 | 1 | 0 | 0 | 0 |
| (Carry) | 0 | 0 | 1 | 0 | 0 | 0 | 1 | 0 |
| 6th Frame | 0 | 0 | 0 | 1 | 0 | 0 | 0 | 1 |
| (Carry) | 0 | 1 | 0 | 0 | 0 | 1 | 0 | 0 |
| 7th Frame | 0 | 0 | 1 | 0 | 0 | 0 | 1 | 0 |
| (Carry) | 1 | 0 | 0 | 0 | 1 | 0 | 0 | 0 |
| 8th Frame | 0 | 1 | 0 | 0 | 0 | 1 | 0 | 0 |
| (Carry) | 0 | 0 | 0 | 1 | 0 | 0 | 0 | 1 |
| 9th Frame | 0 | 0 | 0 | 0 | 1 | 0 | 0 | 0 |
| (Carry) | 0 | 0 | 0 | 0 | 0 | 1 | 0 | 0 |
| 10th Frame | 0 | 0 | 0 | 0 | 0 | 0 | 0 | 1 |
| (Carry) | 0 | 0 | 0 | 0 | 1 | 0 | 0 | 0 |
| 11th Frame | 0 | 0 | 0 | 0 | 0 | 0 | 1 | 0 |
| (Carry) | 0 | 0 | 0 | 0 | 1 | 0 | 0 | 0 |
| 12th Frame | 0 | 0 | 0 | 0 | 1 | 0 | 0 | 0 |
| (Carry) | 0 | 0 | 0 | 0 | 0 | 0 | 0 | 1 |
| 13th Frame | 1 | 0 | 0 | 0 | 0 | 0 | 0 | 0 |
| (Carry) | 0 | 0 | 1 | 0 | 0 | 0 | 0 | 0 |
| 14th Frame | 0 | 0 | 0 | 1 | 0 | 0 | 0 | 0 |
| (Carry) | 0 | 1 | 0 | 0 | 0 | 0 | 0 | 0 |
| 15th Frame | 0 | 0 | 1 | 0 | 0 | 0 | 0 | 0 |
| (Carry) | 1 | 0 | 0 | 0 | 0 | 0 | 0 | 0 |
| 16th Frame | 0 | 1 | 0 | 0 | 0 | 0 | 0 | 0 |
| (Carry) | 0 | 0 | 0 | 1 | 0 | 0 | 0 | 0 |

TABLE 6-3

Table of Correspondence of 3-Dimensional Dithering according to an Embodiment of the Present Invention

| | Input Blocks (4 LSBs) | | | | | | | |
|---|---|---|---|---|---|---|---|---|
| | 0100 0100 | 0100 0100 | 0100 0100 | 0100 0100 | 0101 0101 | 0101 0101 | 0101 0101 | 0101 0101 |
| 1st Frame | 1 | 0 | 0 | 0 | 1 | 0 | 0 | 0 |
| (Carry) | 0 | 0 | 1 | 0 | 0 | 0 | 1 | 0 |
| 2nd Frame | 0 | 0 | 0 | 1 | 0 | 0 | 0 | 1 |
| (Carry) | 0 | 1 | 0 | 0 | 0 | 1 | 0 | 0 |
| 3rd Frame | 0 | 0 | 1 | 0 | 0 | 0 | 1 | 0 |
| (Carry) | 1 | 0 | 0 | 0 | 1 | 0 | 0 | 0 |
| 4th Frame | 0 | 1 | 0 | 0 | 0 | 1 | 0 | 0 |
| (Carry) | 0 | 0 | 0 | 1 | 0 | 0 | 0 | 1 |
| 5th Frame | 1 | 0 | 0 | 0 | 1 | 0 | 0 | 0 |
| (Carry) | 0 | 0 | 1 | 0 | 0 | 0 | 1 | 0 |
| 6th Frame | 0 | 0 | 0 | 1 | 0 | 0 | 0 | 1 |
| (Carry) | 0 | 1 | 0 | 0 | 0 | 1 | 0 | 0 |
| 7th Frame | 0 | 0 | 1 | 0 | 0 | 0 | 1 | 0 |
| (Carry) | 1 | 0 | 0 | 0 | 1 | 0 | 0 | 0 |
| 8th Frame | 0 | 1 | 0 | 0 | 0 | 1 | 0 | 0 |
| (Carry) | 0 | 0 | 0 | 1 | 0 | 0 | 0 | 1 |
| 9th Frame | 1 | 0 | 0 | 0 | 1 | 0 | 0 | 0 |
| (Carry) | 0 | 0 | 1 | 0 | 0 | 0 | 1 | 0 |
| 10th Frame | 0 | 0 | 0 | 1 | 0 | 0 | 0 | 1 |
| (Carry) | 0 | 1 | 0 | 0 | 0 | 1 | 0 | 0 |
| 11th Frame | 0 | 0 | 1 | 0 | 0 | 0 | 1 | 0 |
| (Carry) | 1 | 0 | 0 | 0 | 1 | 0 | 0 | 0 |

TABLE 6-3-continued

Table of Correspondence of 3-Dimensional Dithering according to an Embodiment of the Present Invention

| | Input Blocks (4 LSBs) | | | | | | | |
|---|---|---|---|---|---|---|---|---|
| | 0100 0100 | 0100 0100 | 0100 0100 | 0100 0100 | 0101 0101 | 0101 0101 | 0101 0101 | 0101 0101 |
| 12th Frame | 0 | 1 | 0 | 0 | 0 | 1 | 0 | 0 |
| (Carry) | 0 | 0 | 0 | 1 | 0 | 0 | 0 | 1 |
| 13th Frame | 1 | 0 | 0 | 0 | 0 | 0 | 0 | 0 |
| (Carry) | 0 | 0 | 1 | 0 | 1 | 1 | 1 | 1 |
| 14th Frame | 0 | 0 | 0 | 1 | 1 | 1 | 1 | 1 |
| (Carry) | 0 | 1 | 0 | 0 | 0 | 0 | 0 | 0 |
| 15th Frame | 0 | 0 | 1 | 0 | 0 | 0 | 0 | 0 |
| (Carry) | 1 | 0 | 0 | 0 | 1 | 1 | 1 | 1 |
| 16th Frame | 0 | 1 | 0 | 0 | 1 | 1 | 1 | 1 |
| (Carry) | 0 | 0 | 0 | 1 | 0 | 0 | 0 | 0 |

TABLE 6-4

Table of Correspondence of 3-Dimensional Dithering according to an Embodiment of the Present Invention

| | Input Blocks (4 LSBs) | | | | | | | |
|---|---|---|---|---|---|---|---|---|
| | 0110 0110 | 0110 0110 | 0110 0110 | 0110 0110 | 0111 0111 | 0111 0111 | 0111 0111 | 0111 0111 |
| 1st Frame | 1 | 0 | 0 | 0 | 0 | 0 | 0 | 0 |
| (Carry) | 0 | 0 | 1 | 0 | 1 | 1 | 1 | 1 |
| 2nd Frame | 0 | 0 | 0 | 1 | 1 | 1 | 1 | 1 |
| (Carry) | 0 | 1 | 0 | 0 | 0 | 0 | 0 | 0 |
| 3rd Frame | 0 | 0 | 1 | 0 | 0 | 0 | 0 | 0 |
| (Carry) | 1 | 0 | 0 | 0 | 1 | 1 | 1 | 1 |
| 4th Frame | 0 | 1 | 0 | 0 | 1 | 1 | 1 | 1 |
| (Carry) | 0 | 0 | 0 | 1 | 0 | 0 | 0 | 0 |
| 5th Frame | 0 | 0 | 0 | 0 | 0 | 0 | 0 | 0 |
| (Carry) | 1 | 1 | 1 | 1 | 1 | 1 | 1 | 1 |
| 6th Frame | 1 | 1 | 1 | 1 | 1 | 1 | 1 | 1 |
| (Carry) | 0 | 0 | 0 | 0 | 0 | 0 | 0 | 0 |
| 7th Frame | 0 | 0 | 0 | 0 | 0 | 0 | 0 | 0 |
| (Carry) | 1 | 1 | 1 | 1 | 1 | 1 | 1 | 1 |
| 8th Frame | 1 | 1 | 1 | 1 | 1 | 1 | 1 | 1 |
| (Carry) | 0 | 0 | 0 | 0 | 0 | 0 | 0 | 0 |
| 9th Frame | 1 | 0 | 0 | 0 | 0 | 0 | 0 | 0 |
| (Carry) | 0 | 0 | 1 | 0 | 1 | 1 | 1 | 1 |
| 10th Frame | 0 | 0 | 0 | 1 | 1 | 1 | 1 | 1 |
| (Carry) | 0 | 1 | 0 | 0 | 0 | 0 | 0 | 0 |
| 11th Frame | 0 | 0 | 1 | 0 | 0 | 0 | 0 | 0 |
| (Carry) | 1 | 0 | 0 | 0 | 1 | 1 | 1 | 1 |
| 12th Frame | 0 | 1 | 0 | 0 | 1 | 1 | 1 | 1 |
| (Carry) | 0 | 0 | 0 | 1 | 0 | 0 | 0 | 0 |
| 13th Frame | 0 | 0 | 0 | 0 | 1 | 0 | 0 | 0 |
| (Carry) | 1 | 1 | 1 | 1 | 0 | 0 | 1 | 0 |
| 14th Frame | 1 | 1 | 1 | 1 | 0 | 0 | 0 | 1 |
| (Carry) | 0 | 0 | 0 | 0 | 0 | 1 | 0 | 0 |
| 15th Frame | 0 | 0 | 0 | 0 | 0 | 0 | 1 | 0 |
| (Carry) | 1 | 1 | 1 | 1 | 0 | 0 | 0 | 1 |
| 16th Frame | 1 | 1 | 1 | 1 | 0 | 1 | 0 | 0 |
| (Carry) | 0 | 0 | 0 | 0 | 0 | 0 | 0 | 1 |

TABLE 6-5

Table of Correspondence of 3-Dimensional Dithering according to an Embodiment of the Present Invention

| | Input Blocks (4 LSBs) | | | | | | | |
|---|---|---|---|---|---|---|---|---|
| | 1000 1000 | 1000 1000 | 1000 1000 | 1000 1000 | 1001 1001 | 1001 1001 | 1001 1001 | 1001 1001 |
| $1^{st}$ Frame | 0 | 0 | 0 | 0 | 0 | 0 | 0 | 0 |
| (Carry) | 1 | 1 | 1 | 1 | 1 | 1 | 1 | 1 |
| $2^{nd}$ Frame | 1 | 1 | 1 | 1 | 1 | 1 | 1 | 1 |
| (Carry) | 0 | 0 | 0 | 0 | 0 | 0 | 0 | 0 |
| $3^{rd}$ Frame | 0 | 0 | 0 | 0 | 0 | 0 | 0 | 0 |
| (Carry) | 1 | 1 | 1 | 1 | 1 | 1 | 1 | 1 |
| $4^{th}$ Frame | 1 | 1 | 1 | 1 | 1 | 1 | 1 | 1 |
| (Carry) | 0 | 0 | 0 | 0 | 0 | 0 | 0 | 0 |
| $5^{th}$ Frame | 0 | 0 | 0 | 0 | 0 | 0 | 0 | 0 |
| (Carry) | 1 | 1 | 1 | 1 | 1 | 1 | 1 | 1 |
| $6^{th}$ Frame | 1 | 1 | 1 | 1 | 1 | 1 | 1 | 1 |
| (Carry) | 0 | 0 | 0 | 0 | 0 | 0 | 0 | 0 |
| $7^{th}$ Frame | 0 | 0 | 0 | 0 | 0 | 0 | 0 | 0 |
| (Carry) | 1 | 1 | 1 | 1 | 1 | 1 | 1 | 1 |
| $8^{th}$ Frame | 1 | 1 | 1 | 1 | 1 | 1 | 1 | 1 |
| (Carry) | 0 | 0 | 0 | 0 | 0 | 0 | 0 | 0 |
| $9^{th}$ Frame | 0 | 0 | 0 | 0 | 0 | 0 | 0 | 0 |
| (Carry) | 1 | 1 | 1 | 1 | 1 | 1 | 1 | 1 |
| $10^{th}$ Frame | 1 | 1 | 1 | 1 | 1 | 1 | 1 | 1 |
| (Carry) | 0 | 0 | 0 | 0 | 0 | 0 | 0 | 0 |
| $11^{th}$ Frame | 0 | 0 | 0 | 0 | 0 | 0 | 0 | 0 |
| (Carry) | 1 | 1 | 1 | 1 | 1 | 1 | 1 | 1 |
| $12^{th}$ Frame | 1 | 1 | 1 | 1 | 1 | 1 | 1 | 1 |
| (Carry) | 0 | 0 | 0 | 0 | 0 | 0 | 0 | 0 |
| $13^{th}$ Frame | 0 | 0 | 0 | 0 | 0 | 1 | 1 | 1 |
| (Carry) | 1 | 1 | 1 | 1 | 1 | 1 | 0 | 1 |
| $14^{th}$ Frame | 1 | 1 | 1 | 1 | 1 | 1 | 1 | 0 |
| (Carry) | 0 | 0 | 0 | 0 | 1 | 0 | 1 | 1 |
| $15^{th}$ Frame | 0 | 0 | 0 | 0 | 1 | 1 | 0 | 1 |
| (Carry) | 1 | 1 | 1 | 1 | 0 | 1 | 1 | 1 |
| $16^{th}$ Frame | 1 | 1 | 1 | 1 | 1 | 0 | 1 | 1 |
| (Carry) | 0 | 0 | 0 | 0 | 1 | 1 | 1 | 0 |

TABLE 6-6

Table of Correspondence of 3-Dimensional Dithering according to an Embodiment of the Present Invention

| | Input Blocks (4 LSBs) | | | | | | | |
|---|---|---|---|---|---|---|---|---|
| | 1010 1010 | 1010 1010 | 1010 1010 | 1010 1010 | 1011 1011 | 1011 1011 | 1011 1011 | 1011 1011 |
| $1^{st}$ Frame | 0 | 0 | 0 | 0 | 0 | 1 | 1 | 1 |
| (Carry) | 1 | 1 | 1 | 1 | 1 | 1 | 0 | 1 |
| $2^{nd}$ Frame | 1 | 1 | 1 | 1 | 1 | 1 | 1 | 0 |
| (Carry) | 0 | 0 | 0 | 0 | 1 | 0 | 1 | 1 |
| $3^{rd}$ Frame | 0 | 0 | 0 | 0 | 1 | 1 | 0 | 1 |
| (Carry) | 1 | 1 | 1 | 1 | 0 | 1 | 1 | 1 |
| $4^{th}$ Frame | 1 | 1 | 1 | 1 | 1 | 0 | 1 | 1 |
| (Carry) | 0 | 0 | 0 | 0 | 1 | 1 | 1 | 0 |
| $5^{th}$ Frame | 0 | 1 | 1 | 1 | 0 | 1 | 1 | 1 |
| (Carry) | 1 | 1 | 0 | 1 | 1 | 1 | 0 | 1 |
| $6^{th}$ Frame | 1 | 1 | 1 | 0 | 1 | 1 | 1 | 0 |
| (Carry) | 1 | 0 | 1 | 1 | 1 | 0 | 1 | 1 |
| $7^{th}$ Frame | 1 | 1 | 0 | 1 | 1 | 1 | 0 | 1 |
| (Carry) | 0 | 1 | 1 | 1 | 0 | 1 | 1 | 1 |
| $8^{th}$ Frame | 1 | 0 | 1 | 1 | 1 | 0 | 1 | 1 |
| (Carry) | 1 | 1 | 1 | 0 | 1 | 1 | 1 | 0 |
| $9^{th}$ Frame | 0 | 0 | 0 | 0 | 0 | 1 | 1 | 1 |
| (Carry) | 1 | 1 | 1 | 1 | 1 | 1 | 0 | 1 |
| $10^{th}$ Frame | 1 | 1 | 1 | 1 | 1 | 1 | 1 | 0 |
| (Carry) | 0 | 0 | 0 | 0 | 1 | 0 | 1 | 1 |
| $11^{th}$ Frame | 0 | 0 | 0 | 0 | 1 | 1 | 0 | 1 |
| (Carry) | 1 | 1 | 1 | 1 | 0 | 1 | 1 | 1 |

TABLE 6-6-continued

Table of Correspondence of 3-Dimensional Dithering according to an Embodiment of the Present Invention

| | Input Blocks (4 LSBs) | | | | | | | |
|---|---|---|---|---|---|---|---|---|
| | 1010 1010 | 1010 1010 | 1010 1010 | 1010 1010 | 1011 1011 | 1011 1011 | 1011 1011 | 1011 1011 |
| $12^{th}$ Frame | 1 | 1 | 1 | 1 | 1 | 0 | 1 | 1 |
| (Carry) | 0 | 0 | 0 | 0 | 1 | 1 | 1 | 0 |
| $13^{th}$ Frame | 0 | 1 | 1 | 1 | 0 | 0 | 0 | 0 |
| (Carry) | 1 | 1 | 0 | 1 | 1 | 1 | 1 | 1 |
| $14^{th}$ Frame | 1 | 1 | 1 | 0 | 1 | 1 | 1 | 1 |
| (Carry) | 1 | 0 | 1 | 1 | 0 | 0 | 0 | 0 |
| $15^{th}$ Frame | 1 | 1 | 0 | 1 | 0 | 0 | 0 | 0 |
| (Carry) | 0 | 1 | 1 | 1 | 1 | 1 | 1 | 1 |
| $16^{th}$ Frame | 1 | 0 | 1 | 1 | 1 | 1 | 1 | 1 |
| (Carry) | 1 | 1 | 1 | 0 | 0 | 0 | 0 | 0 |

TABLE 6-7

Table of Correspondence of 3-Dimensional Dithering according to an Embodiment of the Present Invention

| | Input Blocks (4 LSBs) | | | | | | | |
|---|---|---|---|---|---|---|---|---|
| | 1100 1100 | 1100 1100 | 1100 1100 | 1100 1100 | 1101 1101 | 1101 1101 | 1101 1101 | 1101 1101 |
| $1^{st}$ Frame | 0 | 1 | 1 | 1 | 0 | 1 | 1 | 1 |
| (Carry) | 1 | 1 | 0 | 1 | 1 | 1 | 0 | 1 |
| $2^{nd}$ Frame | 1 | 1 | 1 | 0 | 1 | 1 | 1 | 0 |
| (Carry) | 1 | 0 | 1 | 1 | 1 | 0 | 1 | 1 |
| $3^{rd}$ Frame | 1 | 1 | 0 | 1 | 1 | 1 | 0 | 1 |
| (Carry) | 0 | 1 | 1 | 1 | 0 | 1 | 1 | 1 |
| $4^{th}$ Frame | 1 | 0 | 1 | 1 | 1 | 0 | 1 | 1 |
| (Carry) | 1 | 1 | 1 | 0 | 1 | 1 | 1 | 0 |
| $5^{th}$ Frame | 0 | 1 | 1 | 1 | 0 | 1 | 1 | 1 |
| (Carry) | 1 | 1 | 0 | 1 | 1 | 1 | 0 | 1 |
| $6^{th}$ Frame | 1 | 1 | 1 | 0 | 1 | 1 | 1 | 0 |
| (Carry) | 1 | 0 | 1 | 1 | 1 | 0 | 1 | 1 |
| $7^{th}$ Frame | 1 | 1 | 0 | 1 | 1 | 1 | 0 | 1 |
| (Carry) | 0 | 1 | 1 | 1 | 0 | 1 | 1 | 1 |
| $8^{th}$ Frame | 1 | 0 | 1 | 1 | 1 | 0 | 1 | 1 |
| (Carry) | 1 | 1 | 1 | 0 | 1 | 1 | 1 | 0 |
| $9^{th}$ Frame | 0 | 1 | 1 | 1 | 0 | 1 | 1 | 1 |
| (Carry) | 1 | 1 | 0 | 1 | 1 | 1 | 0 | 1 |
| $10^{th}$ Frame | 1 | 1 | 1 | 0 | 1 | 1 | 1 | 0 |
| (Carry) | 1 | 0 | 1 | 1 | 1 | 0 | 1 | 1 |
| $11^{th}$ Frame | 1 | 1 | 0 | 1 | 1 | 1 | 0 | 1 |
| (Carry) | 0 | 1 | 1 | 1 | 0 | 1 | 1 | 1 |
| $12^{th}$ Frame | 1 | 0 | 1 | 1 | 1 | 0 | 1 | 1 |
| (Carry) | 1 | 1 | 1 | 0 | 1 | 1 | 1 | 0 |
| $13^{th}$ Frame | 0 | 1 | 1 | 1 | 1 | 1 | 1 | 1 |
| (Carry) | 1 | 1 | 0 | 1 | 1 | 1 | 1 | 1 |
| $14^{th}$ Frame | 1 | 1 | 1 | 0 | 1 | 1 | 1 | 1 |
| (Carry) | 1 | 0 | 1 | 1 | 1 | 1 | 1 | 1 |
| $15^{th}$ Frame | 1 | 1 | 0 | 1 | 1 | 1 | 1 | 1 |
| (Carry) | 0 | 1 | 1 | 1 | 1 | 1 | 1 | 1 |
| $16^{th}$ Frame | 1 | 0 | 1 | 1 | 1 | 1 | 1 | 1 |
| (Carry) | 1 | 1 | 1 | 0 | 1 | 1 | 1 | 1 |

TABLE 6-8

Table of Correspondence of 3-Dimensional Dithering according to an Embodiment of the Present Invention

| | Input Blocks (4 LSBs) | | | | | | | |
|---|---|---|---|---|---|---|---|---|
| | 1110 1110 | 1110 1110 | 1110 1110 | 1110 1110 | 1111 1111 | 1111 1111 | 1111 1111 | 1111 1111 |
| $1^{st}$ Frame | 0 | 1 | 1 | 1 | 1 | 1 | 1 | 1 |
| (Carry) | 1 | 1 | 0 | 1 | 1 | 1 | 1 | 1 |
| $2^{nd}$ Frame | 1 | 1 | 1 | 0 | 1 | 1 | 1 | 1 |
| (Carry) | 1 | 0 | 1 | 1 | 1 | 1 | 1 | 1 |
| $3^{rd}$ Frame | 1 | 1 | 0 | 1 | 1 | 1 | 1 | 1 |
| (Carry) | 0 | 1 | 1 | 1 | 1 | 1 | 1 | 1 |
| $4^{th}$ Frame | 1 | 0 | 1 | 1 | 1 | 1 | 1 | 1 |
| (Carry) | 1 | 1 | 1 | 0 | 1 | 1 | 1 | 1 |
| $5^{th}$ Frame | 1 | 1 | 1 | 1 | 1 | 1 | 1 | 1 |
| (Carry) | 1 | 1 | 1 | 1 | 1 | 1 | 1 | 1 |
| $6^{th}$ Frame | 1 | 1 | 1 | 1 | 1 | 1 | 1 | 1 |
| (Carry) | 1 | 1 | 1 | 1 | 1 | 1 | 1 | 1 |
| $7^{th}$ Frame | 1 | 1 | 1 | 1 | 1 | 1 | 1 | 1 |
| (Carry) | 1 | 1 | 1 | 1 | 1 | 1 | 1 | 1 |
| $8^{th}$ Frame | 1 | 1 | 1 | 1 | 1 | 1 | 1 | 1 |
| (Carry) | 1 | 1 | 1 | 1 | 1 | 1 | 1 | 1 |
| $9^{th}$ Frame | 0 | 1 | 1 | 1 | 1 | 1 | 1 | 1 |
| (Carry) | 1 | 1 | 0 | 1 | 1 | 1 | 1 | 1 |
| $10^{th}$ Frame | 1 | 1 | 1 | 0 | 1 | 1 | 1 | 1 |
| (Carry) | 1 | 0 | 1 | 1 | 1 | 1 | 1 | 1 |
| $11^{th}$ Frame | 1 | 1 | 0 | 1 | 1 | 1 | 1 | 1 |
| (Carry) | 0 | 1 | 1 | 1 | 1 | 1 | 1 | 1 |
| $12^{th}$ Frame | 1 | 0 | 1 | 1 | 1 | 1 | 1 | 1 |
| (Carry) | 1 | 1 | 1 | 0 | 1 | 1 | 1 | 1 |
| $13^{th}$ Frame | 1 | 1 | 1 | 1 | 0 | 1 | 1 | 1 |
| (Carry) | 1 | 1 | 1 | 1 | 1 | 1 | 0 | 1 |
| $14^{th}$ Frame | 1 | 1 | 1 | 1 | 1 | 1 | 1 | 0 |
| (Carry) | 1 | 1 | 1 | 1 | 1 | 0 | 1 | 1 |
| $15^{th}$ Frame | 1 | 1 | 1 | 1 | 1 | 1 | 0 | 1 |
| (Carry) | 1 | 1 | 1 | 1 | 0 | 1 | 1 | 1 |
| $16^{th}$ Frame | 1 | 1 | 1 | 1 | 1 | 0 | 1 | 1 |
| (Carry) | 1 | 1 | 1 | 1 | 1 | 1 | 1 | 0 |

The present invention is not limited to the above embodiments. More general rules will be illustrated below with reference to FIG. 1.

FIG. 1 is a flow chart of the 2-dimensional dithering method and the 3-dimensional dithering method according to another embodiment of the present invention. The first four steps of the two dithering methods are the same. The two dithering methods of this embodiment both represent A-bit grayscale levels with a B-bit resolution, where A and B are positive integers and A>B. The 2-dimensional dithering method is illustrated first below.

Firstly, the table of correspondence between the signal grayscale values and the target grayscale values is established in Step 102, i.e., the correspondence between the values is determined. The process involves designating a corresponding target grayscale value within the interval from 0 to $(2^B-1)*2^{A-B}$ for each signal grayscale value from 0 to $2^A-1$. The $2^A$ target grayscale values must form a strictly increasing sequence, i.e., to any two different signal grayscale values X1 and X2, if the corresponding target grayscale value of X1 is Y1, the corresponding target grayscale value of X2 is Y2, and if X1>X2, then Y1>Y2. In addition, if the target grayscale values are expressed in binary, each of the target grayscale values has A integer digits and C decimal digits, where C is a positive integer.

In this embodiment, the signal grayscale value 0 is corresponding to the target grayscale value 0, and the signal grayscale value $2^A-1$ is corresponding to the target grayscale value $(2^B-1)*2^{A-B}$.

If the input signal grayscale value is X, in Step 104, according to the correspondence between the $2^A$ signal grayscales and the $2^A$ target grayscale values, the target grayscale value Y corresponding to the signal grayscale value X is obtained.

If an E*F pixel block is used in this method, the target grayscale value Y must be represented by using the 2-dimensional dithering, i.e., the grayscale value of each pixel in the pixel block is set, such that the average grayscale value of the pixel block equals to Y. Before the above setting, two figures must be first calculated. First, the mantissa length D is calculated in Step 106, i.e., the mantissa length D=A-B+C. Then, the mantissa K is calculated in Step 108. The mantissa K is the values of the D LSBs of Y, and includes integer and decimal parts. It is known from the above description that the mantissa length D is the bit length of the mantissa K.

Then, the flow enters Step 110 to perform the carry and non-carry operations of the 2-dimensional dithering. In this method, among the E*F pixels in the pixel block, the grayscale values of N pixels are set to $Y-K+2^{A-B}$ (carry), and the grayscale values of the rest E*F-N pixels are set to Y-K (non-carry), wherein E*F is a multiple of $2^D$, and N/(E*F)= $K/2^{A-B}$.

Finally, the D LSBs of the grayscale values of the E*F pixels are deleted, and the remainder are the B-bit grayscale values which are applicable to B-bit display devices.

By comparing this embodiment with the previous embodiment, it is found that as long as A is set to 8, B is set to 6, C is set to 2, D is set to 4, E is set to 4, and F is set to 8, the 2-dimensional dithering method of this embodiment will be equal to the 2-dimensional dithering method of the previous embodiment.

Then, the 3-dimensional dithering method of this embodiment is illustrated. Steps 102-108 of this method are the same as those of the 2-dimensional dithering method. Subsequently, the flow enters Step 114 to perform the carry and non-carry operations of the 3-dimensional dithering.

If this method uses an E*F pixel block in P continuous frames as the unit for processing, Step 114 is directed to enable the average grayscale value of the E*F*P pixels to equal to Y. The process of this embodiment involves setting the grayscale values of N pixels among the E*F*P pixels to $Y-K+2^{A-B}$ (carry), and setting the grayscale values of the rest E*F*P-N pixels to Y-K (non-carry), wherein E*F*P is a multiple of $2^D$, and N/(E*F*P)=$K/2^{A-B}$.

Finally, the D LSBs of the grayscale values of the E*F*P pixels are deleted, and the remaining are the B-bit grayscale values which are applicable to B-bit display devices.

By comparing this embodiment with the previous embodiment, it is found that as long as A is set to 8, B is set to 6, C is set to 2, D is set to 4, E is set to 4, F is set to 2, and P is set to 16, the 3-dimensional dithering method of this embodiment will be equal to the 3-dimensional dithering method of the previous embodiment.

To sum up, the present invention uses decimals. $2^A$ target grayscale values within the interval from 0 to $(2^B-1)*2^{A-B}$ are calculated, and then the target grayscale values with decimals are represented by using finer 2-dimensional dithering or 3-dimensional dithering. Therefore, the present invention is superior compared to the prior art, and can represent all color levels of the output device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for dithering image data, suitable for representing A-bit grayscale levels with a B-bit resolution, where A and B are positive integers and A>B, the method for dithering image data comprising:

designating a corresponding target grayscale value within an interval from greater than or equal to 0 to less than or equal to $(2^B-1)*2^{A-B}$ for each signal grayscale value from 0 to $2^A-1$, wherein the $2^A$ target grayscale values form a strictly increasing sequence, and if expressed in binary, each of the target grayscale values has A integer digits and C decimal digits, where C is a positive integer;

wherein if the signal grayscale value to be represented is X, obtaining the target grayscale value Y corresponding to the signal grayscale value X according to the correspondence between the $2^A$ signal grayscale values and the $2^A$ target grayscale values; and representing the target grayscale value Y with 2-dimensional dithering on a display device with the B-bit resolution.

2. The method for dithering image data as claimed in claim 1, wherein the signal grayscale value 0 corresponds to the target grayscale value 0, and the signal grayscale value $2^A-1$ corresponds to the target grayscale value $(2^B-1)*2^{A-B}$.

3. The method for dithering image data as claimed in claim 1, wherein the target grayscale values are calculated with interpolation and rounding off.

4. The method for dithering image data as claimed in claim 1, wherein the step of representing the target grayscale value Y with 2-dimensional dithering further comprises:

setting the grayscale value of each pixel in an E*F pixel block displayed by the display device, such that an average grayscale value of the pixel block is equal to Y.

5. The method for dithering image data as claimed in claim 4, wherein the step of representing the target grayscale value Y with 2-dimensional dithering further comprises:

calculating D=A−B+C;

calculating a value K of the D least significant bits (LSB) of the Y; and setting the grayscale values of N pixels among pixels in the pixel block to $Y-K+2^{A-B}$, and setting the grayscale values of the rest E*F−N pixels to Y−K, wherein E*F is a multiple of $2^D$ and $N/(E*F)=K/2^{A-B}$.

6. The method for dithering image data as claimed in claim 5, further comprising:

deleting the D LSBs of the grayscale values of all the pixels in the pixel block.

7. The method for dithering image data as claimed in claim 5, wherein A is 8, B is 6, C is 2, D is 4, E is 4, and F is 8.

8. A method for dithering image data, suitable for representing A-bit grayscale levels with a B-bit resolution, where A and B are positive integers and A>B, the method for dithering image data comprising:

designating a corresponding target grayscale value within an interval from greater than or equal to 0 to less than or equal to $(2^B-1)*2^{A-B}$ for each signal grayscale value from 0 to $2^A-1$, wherein the $2^A$ target grayscale values form a strictly increasing sequence, and if expressed in binary, each of the target grayscale values has A integer digits and C decimal digits, where C is a positive integer;

wherein if the signal grayscale value to be represented is X, obtaining the target grayscale value Y corresponding to the signal grayscale value X according to the correspondence between the $2^A$ signal grayscale values and the $2^A$ target grayscale values; and representing the target grayscale value Y with 3-dimensional dithering on a display device with the B-bit resolution.

9. The method for dithering image data as claimed in claim 8, wherein the signal grayscale value 0 corresponds to the target grayscale value 0, and the signal grayscale value $2^A-1$ corresponds to the target grayscale value $(2^B-1)*2^{A-B}$.

10. The method for dithering image data as claimed in claim 8, wherein the target grayscale values are calculated with interpolation and rounding off.

11. The method for dithering image data as claimed in claim 8, wherein the step of representing the target grayscale value Y with the 3-dimensional dithering further comprises:

setting the grayscale value of each pixel in an E*F pixel block in P continuous frames displayed by the display device, such that an average grayscale value of the E*F*P pixels is equal to Y.

12. The method for dithering image data as claimed in claim 11, wherein the step of representing the target grayscale value Y with 3-dimensional dithering further comprises:

calculating D=A−B+C;

calculating a value K of the D LSBs of the Y; and setting the grayscale values of N pixels among the E*F*P pixels to $Y-K+2^{A-B}$, and setting the grayscale values of the rest E*F*P−N pixels to Y−K, wherein E*F*P is a multiple of $2^D$ and $N/(E*F*P)=K/2^{A-B}$.

13. The method for dithering image data as claimed in claim 12, further comprising:

deleting the D LSBs of the grayscale values of all the E*F*P pixels.

14. The method for dithering image data as claimed in claim 12, wherein P is a multiple $2^D$.

15. The method for dithering image data as claimed in claim 12, wherein A is 8, B is 6, C is 2, D is 4, E is 4, F is 2, and P is 16.

* * * * *